United States Patent
Kimijima (10) Patent No.: US 10,202,143 B2
(45) Date of Patent: Feb. 12, 2019

(54) POWER STEERING APPARATUS

(71) Applicant: Showa Corporation, Gyoda-shi (JP)

(72) Inventor: Tsutomu Kimijima, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 15 days.

(21) Appl. No.: 15/410,960

(22) Filed: Jan. 20, 2017

(65) Prior Publication Data

US 2017/0274925 A1 Sep. 28, 2017

(30) Foreign Application Priority Data

Mar. 28, 2016 (JP) ................ 2016-063998

(51) Int. Cl.
*B62D 5/04* (2006.01)

(52) U.S. Cl.
CPC ......... *B62D 5/0403* (2013.01); *B62D 5/0409* (2013.01); *B62D 5/0421* (2013.01); *B62D 5/0454* (2013.01); *B62D 5/0463* (2013.01); *B60Y 2410/1022* (2013.01)

(58) Field of Classification Search
CPC ....... B62D 5/04; B62D 5/0403; B62D 5/0454
See application file for complete search history.

(56) References Cited

U.S. PATENT DOCUMENTS

| 7,594,332 | B2 | 9/2009 | Miki |
| 7,938,582 | B2 | 5/2011 | Barlerin et al. |
| 9,452,773 | B2 * | 9/2016 | Sato ............ B62D 5/0421 |
| 2005/0268466 | A1 | 12/2005 | Miki |
| 2008/0152271 | A1 | 6/2008 | Barlerin et al. |
| 2015/0266506 | A1 | 9/2015 | Sato |
| 2015/0276047 | A1 * | 10/2015 | Kimijima ........ F16H 1/16 74/409 |

FOREIGN PATENT DOCUMENTS

| CN | 101124415 A | 2/2008 |
| CN | 1707135 A | 10/2011 |
| CN | 104074866 A | 10/2014 |
| EP | 2345568 A | 7/2011 |
| JP | 2011-093485 A | 5/2011 |
| JP | 5859891 B | 2/2016 |

OTHER PUBLICATIONS

Machine Translation of JP 2011-93485 A, May 12, 2011 (Year: 2011).*
GB Search Report dated Jul. 14, 2017 for the corresponding U.K. Patent Application No. 1701110.7.
Chinese Office Action dated Dec. 13, 2018 for Chinese Application No. 201710060143.5.

* cited by examiner

*Primary Examiner* — Kevin Hurley
(74) *Attorney, Agent, or Firm* — Leason Ellis LLP (57) ABSTRACT

One embodiment provides a power steering apparatus including: a worm gear that is rotated by receiving a driving force; a bearing member that supports the worm gear so as to make the worm gear rotatable; a worm wheel that is connected to the worm gear so as to be rotatable and apply a steering assist force to a steering wheel; and a support member that supports the bearing member so as to make the bearing member slidable in a crossing direction that crosses a rotating shaft of the worm wheel. The support member has a guide surface to guide the bearing member in the crossing direction therealong. The support member also has a holding portion that holds a lubricant in a recessed portion that is recessed from the guide surface.

7 Claims, 11 Drawing Sheets

POWER STEERING APPARATUS

CROSS-REFERENCE TO RELATED APPLICATION(S)

This application claims priority from Japanese Patent Application No. 2016-063998 filed on Mar. 28, 2016, the entire contents of which are incorporated herein by reference.

BACKGROUND

1. Field

The present invention relates to a power steering apparatus.

2. Related Art

For an electric power steering apparatuses for vehicles, during assembly, setting an inter-axis distance between a worm gear and worm wheel needs to be easily performed without being affected by a dimensional error in components such as the worm gear. After assembly, even if the meshing between the worm gear and the worm wheel is subjected to a temporal change, the inter-axis distance needs to be easily adjusted to eliminate backlash in the worm gear and the worm wheel.

For example, JP-5859891-B discloses an electric power steering apparatus having a preload unit that biases a bearing that supports a tip shaft portion of the worm gear, in a predetermined preload direction, so as to impose a preload on the meshing portion between the worm gear and the worm wheel. Japanese JP-5859891-B further discloses that the bias force exerted by the preload unit is used to adjust the inter-axis distance between the worm gear and the worm wheel to eliminate backlash in the worm gear and the worm wheel.

In the configuration in which the preload is imposed on the meshing portion between the worm gear and the worm wheel, a meshing reaction force exerted between the worm gear and the worm wheel may cause the bearing to slide in the preload direction and in a direction opposite to the preload direction. In such a case, sliding of the bearing is expected to lead to lack of a lubricant such as grease, hindering, for example, smooth sliding of the bearing.

SUMMARY

An aspect of the present invention provides a power steering apparatus including: a worm gear that is rotated by receiving a driving force; a bearing member that supports the worm gear so as to make the worm gear rotatable; a worm wheel that is connected to the worm gear so as to be rotatable and apply a steering assist force to a steering wheel; and a support member that supports the bearing member so as to make the bearing member slidable in a crossing direction that crosses a rotating shaft of the worm wheel, the support member having a guide surface along which movement of the bearing member in the crossing direction is guided and a holding portion that holds a lubricant in a recessed portion that is recessed from the guide surface.

The recessed portion of the support member may be a groove extending along a moving direction of the bearing member.

The support member may have a first abutting contact surface with which the bearing member comes into abutting contact when the bearing member moves to one side of the moving direction and a second abutting contact surface with which the bearing member comes into abutting contact when the bearing member moves to an opposite side to the one side. The recessed portion of the support member may be a plurality of grooves extending along the moving direction of the bearing member. A part of the plurality of grooves may be discontinuous, at first ends thereof, with the first abutting contact surface and may be continuous, at second ends thereof, with the second abutting contact surface. An other part of the plurality of grooves may be continuous, at first ends thereof, with the first abutting contact surface and may be discontinuous, at second ends thereof, with the second abutting contact surface.

The support member may have a first abutting contact surface with which the bearing member comes into abutting contact when the bearing member moves to one side of the moving direction and a second abutting contact surface with which the bearing member comes into abutting contact when the bearing member moves to an opposite side to the one side. The recessed portion of the support member may be discontinuous, at respective ends thereof, with both the first abutting contact surface and the second abutting contact surface.

The recessed portion of the support member may have a net-like groove.

The recessed portion of the support member may have a plurality of dimples.

The power steering apparatus further includes a compression member that applies a force to the bearing member so as to press the worm gear against the worm wheel.

An aspect of the present invention allows suppression of the lack of a lubricant that allows a bearing member to slide smoothly.

DESCRIPTION OF THE PREFERRED EMBODIMENTS

An embodiment will be described below in detail with reference to the attached drawings.

(General Configuration of the Electric Power Steering Apparatus 1)

Figure 1:
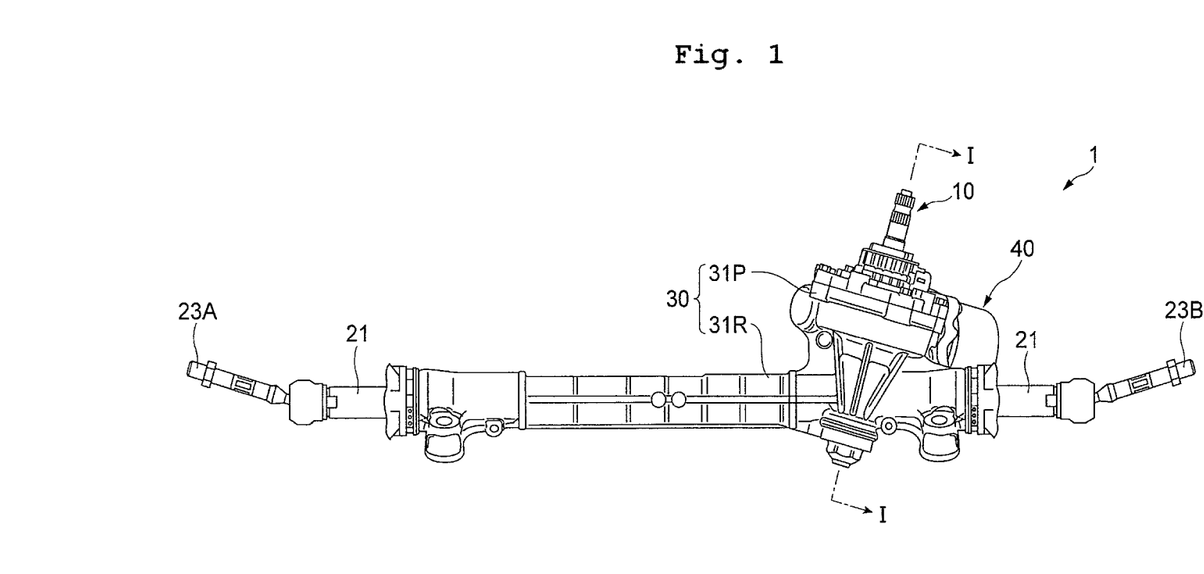
FIG. 1 is a schematic top view of an electric power steering apparatus.

FIG. 1 is a schematic top view of an electric power steering apparatus 1.

Figure 2:
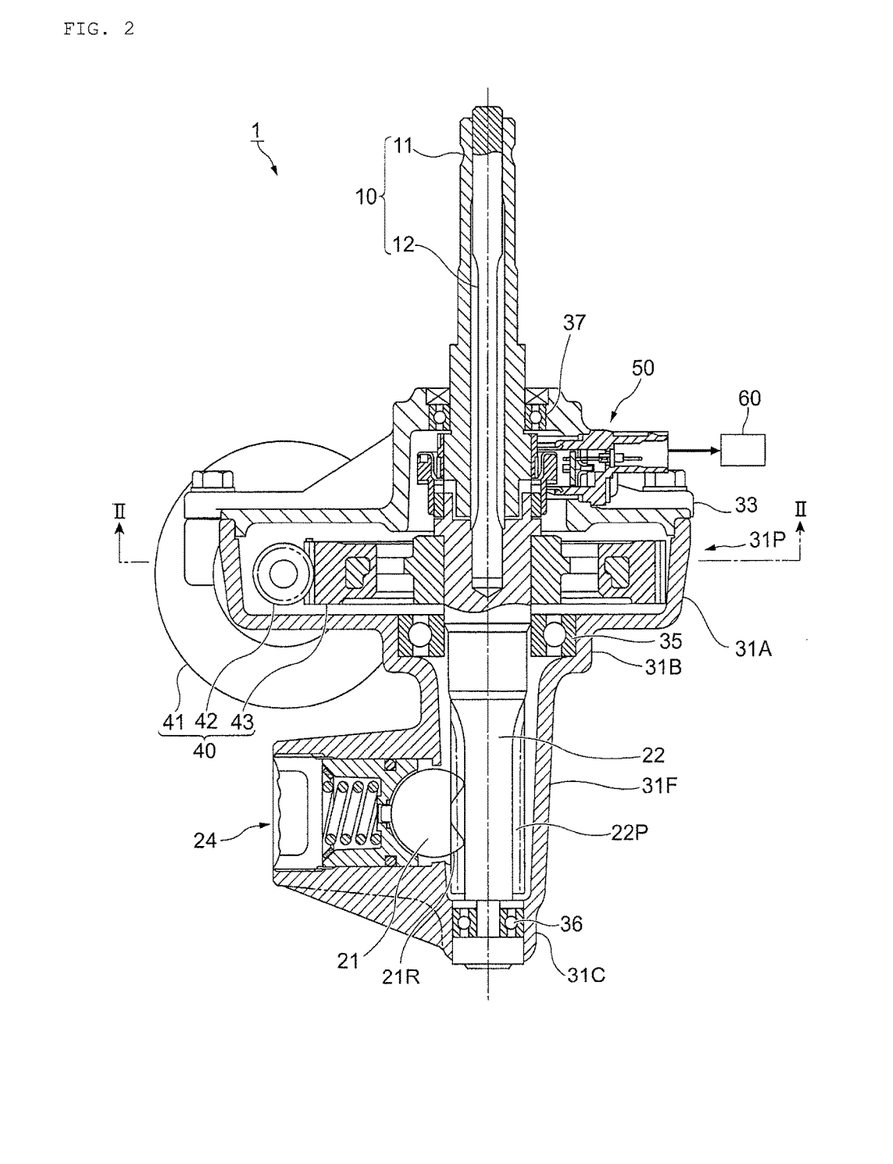
FIG. 2 is a sectional view of the electric power steering apparatus depicted in FIG. 1, the view being taken along line I-I in FIG. 1.

FIG. 2 is a sectional view of the electric power steering apparatus 1 depicted in FIG. 1, the view being taken along line I-I in FIG. 1.

The electric power steering apparatus 1 in the present embodiment is a steering apparatus that optionally varies a traveling direction of a vehicle. The present embodiment illustrates a configuration applied to a vehicle, particularly an automobile. The electric power steering apparatus 1 in the present embodiment is of what is called a pinion assist type.

As depicted in FIG. 1, the electric power steering apparatus 1 includes an input portion 10 to which a steering force is transmitted from a wheel-shaped steering wheel (not depicted in the drawings) operated by a driver, a rack shaft 21 coupled to, for example, tires (not depicted in the drawings) to vary the direction of the tires, and a pinion shaft 22 (see FIG. 2) that receives a torque from the input portion 10 to move the rack shaft 21 in an axial direction.

The electric power steering apparatus 1 includes tie rods 23A and 23B provided at ends of the rack shaft 21 and coupled, for example, to the tires via knuckle arms (not depicted in the drawings), a housing 30 that houses various members, and an assist portion 40 that applies a steering assist force to the pinion shaft 22.

As depicted in FIG. 2, the electric power steering apparatus 1 includes a rack guide 24 that pushes the rack shaft 21 toward the pinion shaft 22, a torque detecting apparatus 50 that detects a steering torque of the steering wheel, and an electronic control unit (ECU) 60.

As depicted in FIG. 2, the input portion 10 has an input shaft 11 to which the steering force is transmitted from the steering wheel operated by the driver and a torsion bar 12 attached inside the input shaft 11.

The rack shaft 21 is a long cylindrical member and has a rack 21R including a plurality of teeth arranged in the axial direction. The rack shaft 21 is installed such that the rack 21R meshes a pinion 22P, described below, of the pinion shaft 22. The rack shaft 21 moves in the axial direction in conjunction with rotation of the pinion shaft 22.

As depicted in FIG. 2, the pinion shaft 22 is a member on which the pinion 22P is formed. As described above, the pinion 22P on the pinion shaft 22 connects to the rack 21R on the rack shaft 21. Then, the pinion shaft 22 and the rack shaft 21 convert a turning force of the pinion shaft 22 into axial movement of the rack shaft 21.

The pinion shaft 22 is connected to the torsion bar 12. Therefore, the pinion shaft 22 is rotated by receiving the steering force from the input shaft 11 via the torsion bar 12. In the present embodiment, the pinion shaft 22 connects to a worm wheel 43 in the assist portion 40. Therefore, the pinion shaft 22 is rotated by receiving not only the steering force from the input shaft 11 but also an assist steering force from the assist portion 40.

As depicted in FIG. 1, the housing 30 includes a rack housing 31R that mainly houses the rack shaft 21 and a pinion housing 31P that mainly houses the pinion shaft 22 (see FIG. 2).

The rack housing 31R is a generally cylindrical member extending in the axial direction along the axial direction of the rack shaft 21. The rack housing 31R holds the rack shaft 21 via a bush not depicted in the drawings to house the rack shaft 21 so as to make the rack shaft 21 movable in the axial direction.

The pinion housing 31P is generally shaped like a cylinder. The pinion housing 31P is provided such that a cylindrical axial direction of the pinion housing 31P crosses the axial direction of the rack housing 31R. As depicted in FIG. 2, the pinion housing 31P holds the pinion shaft 22 via a first bearing 35 and a second bearing 36 so as to make the pinion shaft 22 rotatable. A cover 33 is attached to an opening in the pinion housing 31P. The cover 33 holds the input shaft 11 via a third bearing 37 so as to make the input shaft 11 rotatable.

In the illustrated example, the worm wheel 43, the first bearing 35, and the second bearing 36 are arranged in this order from a central portion toward an end of the pinion shaft 22 in the axial direction. A portion of the pinion housing 31P that internally houses the worm wheel 43 is referred to as a first outer peripheral portion 31A. A portion of the pinion housing 31P that internally houses the first bearing 35 is referred to as a second outer peripheral portion 31B. A portion of the pinion housing 31P that internally houses the second bearing 36 is referred to as a third outer peripheral portion 31C.

As depicted in FIG. 2, the assist portion 40 includes an electric motor 41, a worm gear 42, and the worm wheel 43.

The electric motor 41 is controlled by the electronic control unit 60 to rotationally drive the worm gear 42.

The worm gear 42 is coupled to an output shaft 41A (see FIG. 3; described below) of the electric motor 41.

The worm wheel 43 is coupled to the worm gear 42 such that a driving force from the electric motor 41 is transmitted to the worm wheel 43. Therefore, the turning force of the electric motor 41 is reduced by the worm wheel 43, and the reduced turning force is transmitted to the pinion shaft 22.

A configuration of the assist portion 40 will be described below in detail.

The torque detecting apparatus 50 detects the steering torque of the steering wheel based on a relative angle between the input shaft 11 and the pinion shaft 22, in other words, based on the amount of torsion of the torsion bar 12. The steering torque detected by the torque detecting apparatus 50 is transmitted to the electronic control unit 60.

The electronic control unit 60 has a CPU that executes various calculating processes, a ROM that stores programs executed by the CPU, various data, and the like, and a RAM used as a work memory or the like of the CPU. Based on the steering torque obtained from the torque detecting apparatus 50, driving of the electric motor 41 in the assist portion 40 is controlled.

In the electric power steering apparatus 1 configured as described above, the steering torque applied to the steering wheel appears as a relative rotation angle between the input shaft 11 and the pinion shaft 22. Consequently, the torque detecting apparatus 50 determines the torque based on the relative rotation angle between the input shaft 11 and the pinion shaft 22. Then, the electronic control unit 60 determines the steering torque based on an output value from the torque detecting apparatus 50 to control driving of the electric motor 41 based on the determined steering torque.

The torque generated by electric motor 41 is transmitted to the pinion shaft 22 via the worm gear 42 and the worm wheel 43. Consequently, the torque generated by the electric motor 41 assists the driver's steering force applied to the steering wheel. In other words, the pinion shaft 22 is rotated by the steering torque generated by rotation of the steering wheel and the assist torque applied by the electric motor 41. Moreover, the steering wheel is turned by the rack shaft 21 moving in the axial direction in conjunction with rotation of the pinion shaft 22.

(Details of Configuration of the Assist Portion 40)

Figure 3:
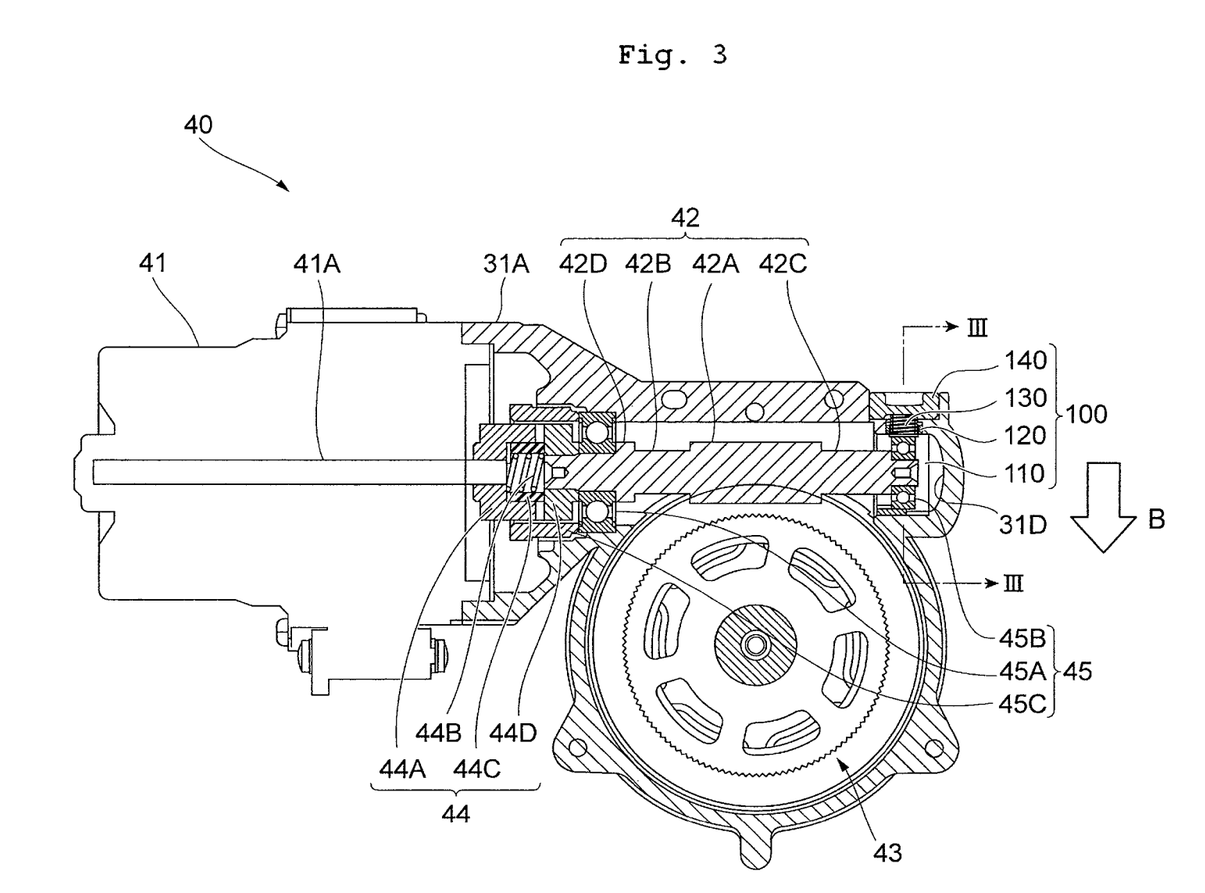
FIG. 3 is a sectional view of the electric power steering apparatus depicted in FIG. 2, the view being taken along line II-II in FIG. 2.

FIG. 3 is a sectional view of the electric power steering apparatus 1 depicted in FIG. 2, the view being taken along line II-II in FIG. 2.

Figure 4:
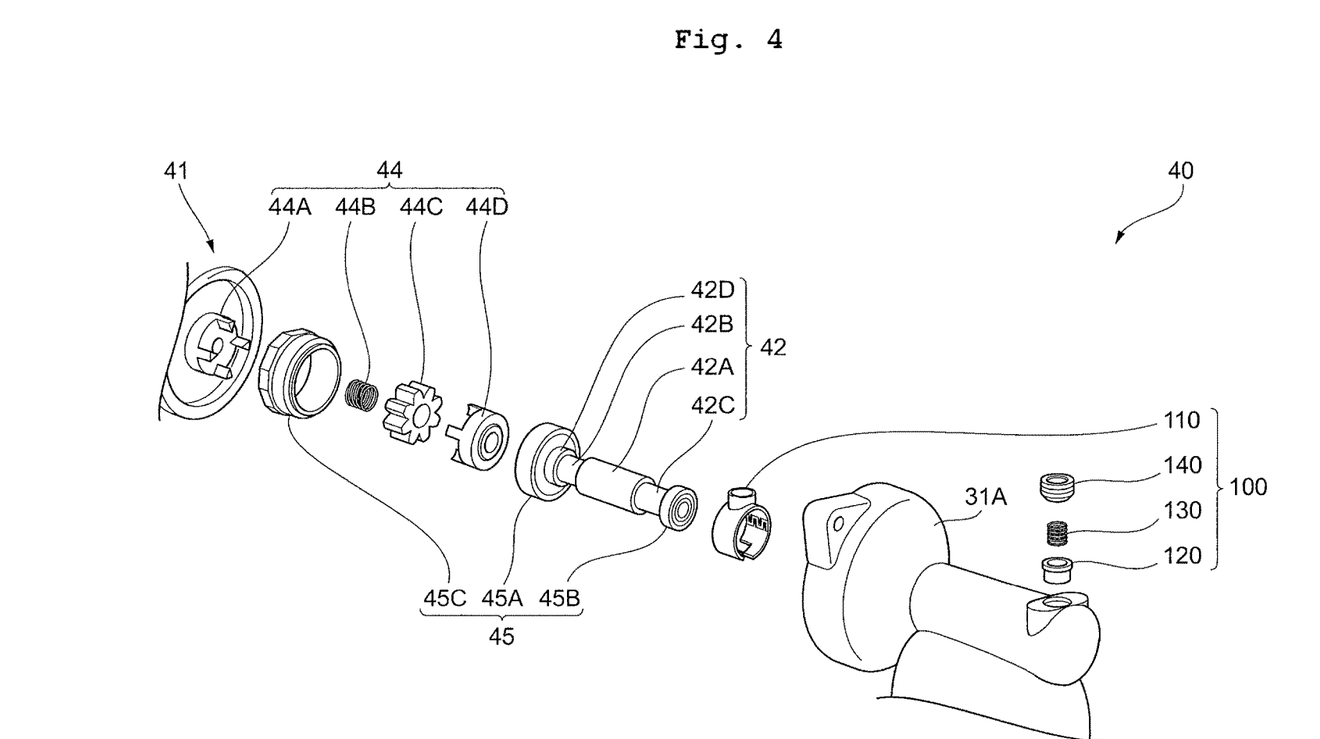
FIG. 4 is an exploded perspective view of an assist portion.

FIG. 4 is an exploded perspective view of the assist portion 40.

Figure 5:
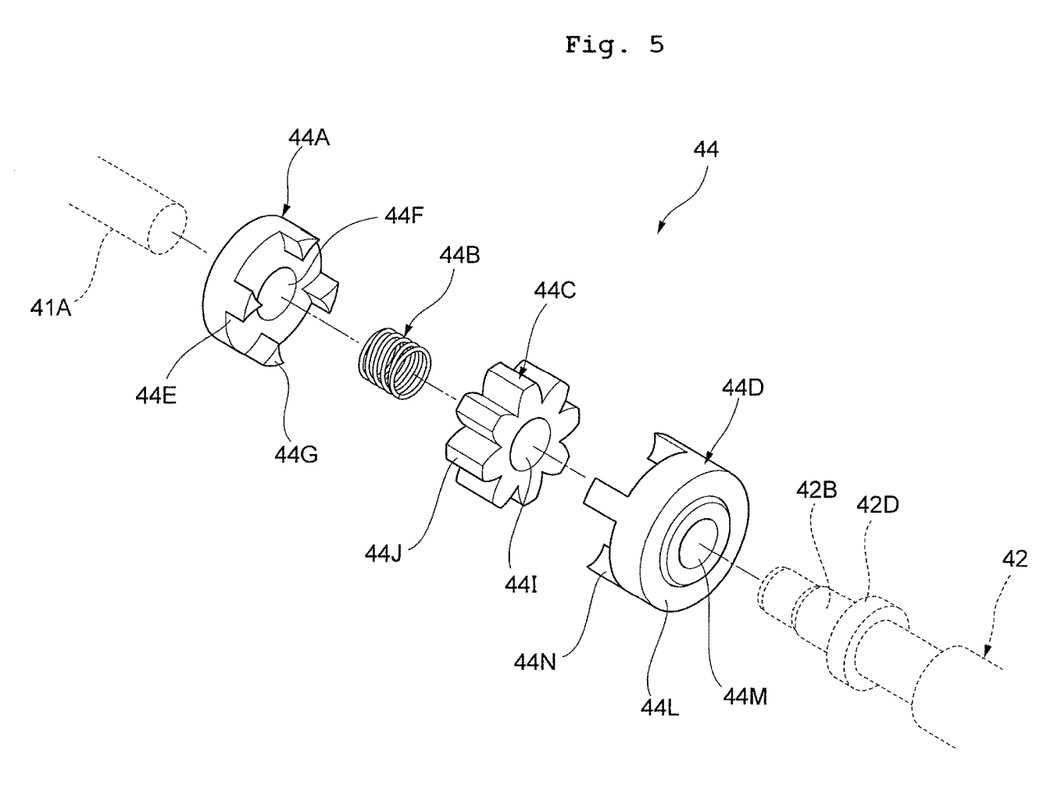
FIG. 5 is an exploded perspective view of a transmission mechanism.

FIG. 5 is an exploded perspective view of a transmission mechanism 44.

Now, with reference to FIGS. 3 to 5, the configuration of the assist portion 40 in the electric power steering apparatus 1 (see FIG. 1) will be described below in detail.

As described above, the assist portion 40 includes the electric motor 41, the worm gear 42 that is rotated by being subjected to driving by the electric motor 41, the worm wheel 43 connected to the worm gear 42 so as to be rotatable.

The assist portion 40 includes the transmission mechanism 44 that transmits the driving by the electric motor 41 to the worm gear 42, a support mechanism 45 that supports the worm gear 42, and a preload mechanism 100 that applies a preload to a meshing portion between the worm gear 42 and the worm wheel 43. The preload mechanism 100 will be described below.

The electric motor 41 includes the output shaft 41A that is rotated by receiving a driving force. The electric motor 41 is, for example, a three-phase brushless motor.

The worm gear 42 includes a tooth portion 42A, shaft portions 42B and 42C positioned on the respective opposite sides of the tooth portion 42A, and a flange portion 42D provided on the shaft portion 42B.

The worm wheel 43 is connected to the tooth portion 42A of the worm gear 42 and fixed to the pinion shaft 22.

As depicted in FIG. 5, the transmission mechanism 44 includes a first coupling 44A, a coil spring 44B, an elastic joint 44C, and a second coupling 44D.

The first coupling 44A includes a main body 44E that is a generally disc-like member, a through-hole 44F formed in a central portion of the main body 44E, and a plurality of blade portions 44G provided on an outer peripheral side of an end face of the main body 44E so as to protrude from the end face in the axial direction. The first coupling 44A is fixed to the output shaft 41A by press-fitting the output shaft 41A into the through-hole 44F.

The coil spring 44B is compressively installed between the first coupling 44A and the second coupling 44D. The coil spring 44B is elastically deformed to absorb axial vibration of the worm gear 42.

The elastic joint 44C includes a through-hole 44I formed in a central portion of the elastic joint 44C and a plurality of protruding portions 44J radially formed at an outer periphery of the through-hole 44I. The blade portions 44G of the first coupling 44A are arranged to be fitted into some of a plurality of opposite clearances each defined by the protruding portions 44J adjacent to each other in a circumferential direction. The elastic joint 44C is an elastic member such as ethylene propylene rubber or the like and is elastically deformed to absorb axial vibration of the worm gear 42.

The second coupling 44D includes a main body 44L that is a generally disc-like member, a through-hole 44M formed in a central portion of the main body 44L, and a plurality of blade portions 44N provided on an outer peripheral side of an end face of the main body 44L so as to protrude from the end face in the axial direction. The blade portions 44N of the second coupling 44D are arranged to be fitted into those of the opposite clearances each between the protruding portions 44J adjacent to each other in the circumferential direction of the elastic joint 44C in which opposite clearances the blade portions 44G of the first coupling 44A are not arranged. The second coupling 44D is fixed to the worm gear 42 by press-fitting the shaft portion 42B of the worm gear 42 into the through-hole 44M.

Now, with reference back to FIGS. 3 and 4, the support mechanism 45 will be described. The support mechanism 45 includes a first bearing 45A, a second bearing 45B that is an example of a bearing member, and a bearing nut 45C.

The first bearing 45A has an outer ring fixed to a first outer peripheral portion 31A and an inner ring fixed to the worm gear 42 by press-fitting the shaft portion 42B of the worm gear 42 into the inner ring. In the illustrated example, the first bearing 45A is arranged so as to be sandwiched between the flange portion 42D of the shaft portion 42B and the second coupling 44D.

The second bearing 45B has an outer ring supported by a bearing case 110 (described below) and an inner ring fixed to the worm gear 42 by press-fitting the shaft portion 42C of the worm gear 42 into the inner ring. Additionally, the second bearing 45B is supported by the bearing case 110 so as to be slidable in a crossing direction crossing a rotating shaft of the worm wheel 43.

The bearing nut 45C is fixedly screw-threaded on the first outer peripheral portion 31A. The bearing nut 45C holds the outer ring of the first bearing 45A. That is, the outer ring of the first bearing 45A is fixed to the first outer peripheral portion 31A via the bearing nut 45C.

(Details of Configuration of the Preload Mechanism 100)

Figure 6:
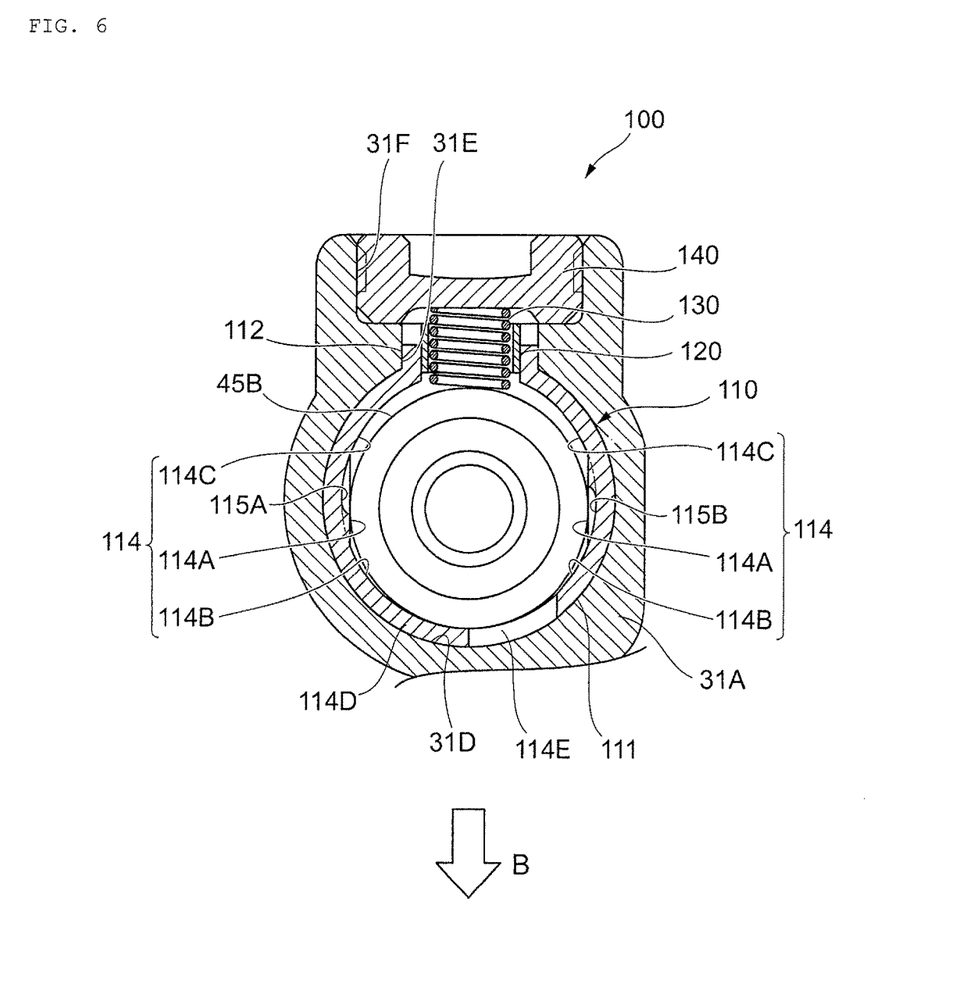
FIG. 6 is a sectional view of a preload mechanism depicted in FIG. 3, the view being taken along line in FIG. 3.

FIG. 6 is a sectional view of the preload mechanism 100 depicted in FIG. 3, the view being taken along line in FIG. 3.

Figure 7A:
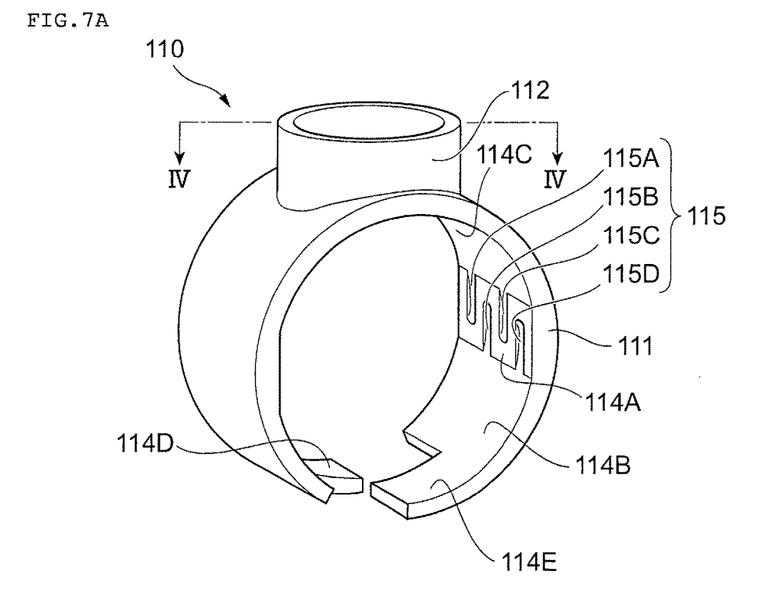
FIG. 7A is a perspective view of a bearing case and FIG. 7B is a sectional view of the bearing case depicted in FIG. 7A, the view being taken along line IV-IV in FIG. 7A.
Figure 7B:
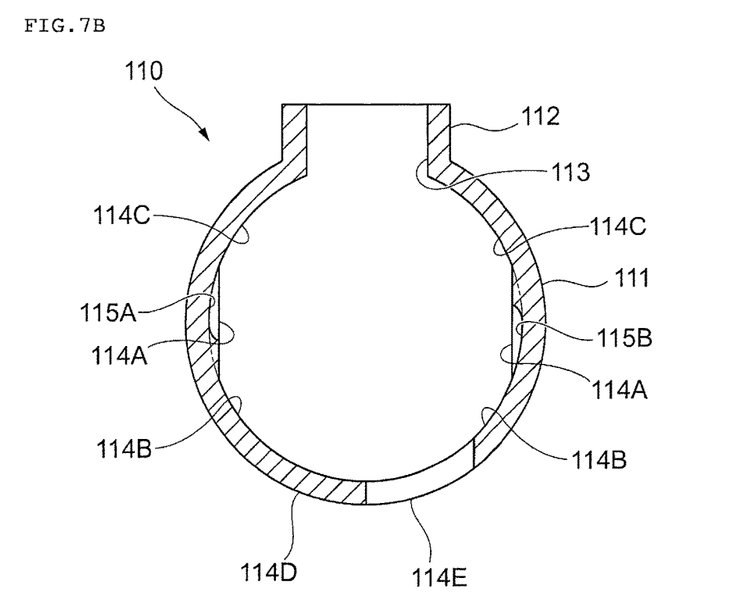

FIG. 7A is a perspective view of the bearing case 110 and FIG. 7B is a sectional view of the bearing case 110 depicted in FIG. 7A, the view being taken along line IV-IV in FIG. 7A.

Now, with reference to FIGS. 4 to 7B, the configuration of the preload mechanism 100 will be described in detail.

The preload mechanism 100 includes the bearing case 110 that is an example of a support member, a cylindrical member 120, a coil spring 130 that is an example of a compression member, and a cap 140.

As depicted in FIGS. 7A and 7B, the bearing case 110 is an oilless bush that is a synthetic resin such as an oil-containing polyacetal resin. The bearing case 110 includes a main body 111 that is a generally annular member that is generally shaped like the letter C by cutting out a part (at a position opposite to the coil spring 130 across the center of the second bearing 45B) of the main body in the circumferential direction, and a generally cylindrical tubular protruding portion 112 protruding outward in a radial direction from a part in the circumference of the outer periphery of the main body 111. In the bearing case 110, a spring insertion hole 113 is formed which makes the inside of the main body 111 and the inside of the tubular protruding portion 112 continuous with the outside of the bearing case 110.

The bearing case 110 further includes guide surfaces 114A that are included in an inner surface 114 of the main body 111 and that are two flat surfaces provided at positions opposite to each other across a central axis of the main body 111. The bearing case 110 includes first abutting contact surfaces 114B that are included in the inner surface 114 of the main body 111 and that are curved surfaces extending from ends of the guide surfaces 114A toward a side opposite to the coil spring 130, and second abutting contact surfaces 114C that are included in the inner surface 114 of the main body 111 and that are curved surfaces extending from ends of the guide surfaces 114A toward the coil spring 130.

Additionally, the first abutting contact surfaces 114B may be considered to be abutting contact surfaces with which the second bearing 45B comes into abutting contact when the second bearing 45B moves one side, which is equal to a preload direction (described below), of the moving direction of the second bearing 45B. The second abutting contact surfaces 114C may be considered to be abutting contact surfaces with which the second bearing 45B comes into abutting contact when the second bearing 45B moves to an opposite side to the one side of the moving direction of the second bearing 45B.

The first abutting contact surfaces 114B have a protruding piece 114D that is one of the ends of the main body 111 that are opposite to each other in the circumferential direction as a result of cut off of the main body 111 to be shaped the letter C, the protruding piece 114D being provided on one end surface of the main body 111 in the axial direction, and a protruding piece 114E that is the other end of the main body 111 and that is provided on one end surface of the main body 111 in the axial direction.

In the bearing case 110, recessed portions 115 are formed which are recessed from the guide surfaces 114A. The recessed portions 115 filled with grease serving as a lubricant allow the bearing case 110 to include a holding portion that holds the lubricant in the recessed portions 115. In other words, the holding portion may be considered to be the recessed portions 115 holding grease.

When the bearing case 110 receives an external force, the distance between the ends that are opposite to each other in the circumferential direction as a result of cut off of the main body to be shaped the letter C is changed to change the diameter of the bearing case 110. When the bearing case 110 has a smaller diameter (diameter reduction state) than in a state where the bearing case 110 receives no external force (natural state), the protruding pieces 114D and 114E may be arranged within a given range in the circumferential direction. The dimensions of the bearing case 110 are such that the bore diameter of the bearing case 110 in a natural state is larger than the outside diameter of the second bearing 45B.

Now, the recessed portions 115 will be described.

As depicted in FIG. 7A, the recessed portions 115 are recessed portions that are recessed from the guide surface 114A and are grooves (for example, four grooves) extending along the moving direction (preload direction (described below)) of the second bearing 45B. Additionally, the recessed portions 115 are formed at positions with which the second bearing 45B comes into contact when sliding in the preload direction and in a direction opposite to the preload direction.

More specifically, the recessed portions 115 are a plurality of recessed portions that are recessed from the guide surface 114A and that includes a recessed portion 115A, a recessed portion 115B, a recessed portion 115C, and a recessed portion 115D. Of the plurality of recessed portions, the recessed portion 115A and the recessed portion 115C are formed such that first ends thereof are discontinuous with the first abutting contact surface 114B, whereas second ends thereof are continuous with the second abutting contact surface 114C. Additionally, the recessed portion 115A and the recessed portion 115C have bottom portions each having the same curved surface as that of the second abutting contact surface 114C. The remaining recessed portion 115B and recessed portion 115D are formed such that first ends thereof are continuous with the first abutting contact surface 114B, whereas second ends thereof are discontinuous with the second abutting contact surface 114C. Additionally, the recessed portion 115B and the recessed portion 115D have bottom portions each having the same curved surface as that of the first abutting contact surface 114B.

Before the second bearing 45B is inserted into the bearing case 110, grease is applied to the inner surface 114 of the main body 111 including the recessed portions 115 so as to allow the second bearing 45B to slide smoothly with respect to the inner surface 114. The grease is held by the recessed portions 115.

The lubricant applied to the inner surface 114 of the main body 111 is not limited to the grease, and any other lubricant may be used.

The cylindrical member (sheet rubber) 120 has a bore diameter having a dimension that allows the coil spring 130 to be inserted into the cylindrical member 120. The cylindrical member 120 supports an outer peripheral surface of the coil spring 130, which is elastically deformed, via an inner peripheral surface of the cylindrical member 120.

The coil spring 130 is compressively installed between an outer peripheral surface of the second bearing 45B and an end face of the cap 140. The coil spring 130 may be an elastic member, and instead of the coil spring 130, any other elastic member, for example, rubber, may be used.

The cap 140 is a generally disc-like member, and an external thread is formed on an outer peripheral surface of the cap 140. The cap 140 is screw-threaded in an internal thread in an annular recessed portion 31F (described below) and thus fixed to the first outer peripheral portion 31A.

Although not described above, the first outer peripheral portion 31A includes a housing space 31D that is a generally cylindrical space, in which the bearing case 110 is housed, and that has an inner diameter smaller than the outer diameter of the bearing case 110 in the natural state, a through-hole 31E into which the tubular protruding portion 112 is inserted and which makes the housing space 31D continuous with the outside of the first outer peripheral portion 31A, and the annular recessed portion 31F formed at the opening of the through-hole 31E. An internal thread is formed in an inner peripheral surface of the annular recessed portion 31F.

Now, with reference to FIG. 6, an assembly procedure for the preload mechanism 100 will be described in brief. First, grease is applied to the inner surface 114 of the main body 111 including the recessed portions 115, and then, the second bearing 45B is placed inside the bearing case 110 in the natural state. The tubular protruding portion 112 is inserted into the through-hole 31E, while the main body 111 is placed in the housing space 31D of the first outer peripheral portion 31A along with the second bearing 45B. At this time, the bearing case 110 shifts from the natural state to the diameter reduction state. The outer periphery of the second bearing 45B is held (housed) by the inner surface 114 of the main body 111.

Then, the cylindrical member 120 is inserted into the spring insertion hole 113 (see FIGS. 7A and 7B), and the coil spring 130 is further inserted into the cylindrical member 120. The cap 140 is fixedly screw-threaded in the annular recessed portion 31F. With the cap 140 fixed, the coil spring 130 inserted into the cylindrical member 120 is compressively installed at one end of the coil spring 130 between the outer peripheral surface of the second bearing 45B and the cap 140.

In the preload mechanism 100 assembled as described above, the second bearing 45B is pressed by the coil spring 130 and biased toward the worm wheel 43 (see FIG. 3) (see arrow B). Thus, as depicted in FIG. 3, the worm gear 42 is pressed against the worm wheel 43 to apply a preload to the meshing portion between the worm gear 42 and the worm wheel 43. The preload suppresses possible backlash in the meshing portion between the worm gear 42 and the worm wheel 43.

In the bearing case 110, the guide surfaces 114A formed therein allow the second bearing 45B to move along the preload direction. This allows the meshing position between the worm gear 42 and the worm wheel 43 to be properly maintained and also allows the worm gear 42 to move smoothly in the radial direction in conjunction with a fluctuation in meshing reaction force.

With the bearing case 110 placed in the housing space 31D, the guide surfaces 114A of the bearing case 110 lie opposite to each other and extend along the preload direction (see arrow B). Furthermore, the guide surfaces 114A are substantially parallel to each other. The substantial parallelism herein refers to such a small angle at which the second bearing 45B is not hindered from moving along the preload direction.

In a direction crossing (orthogonal to) the preload direction, the second bearing 45B is sandwiched between the guide surfaces 114A.

[Effects of the Recessed Portions 115]

Figure 8A:
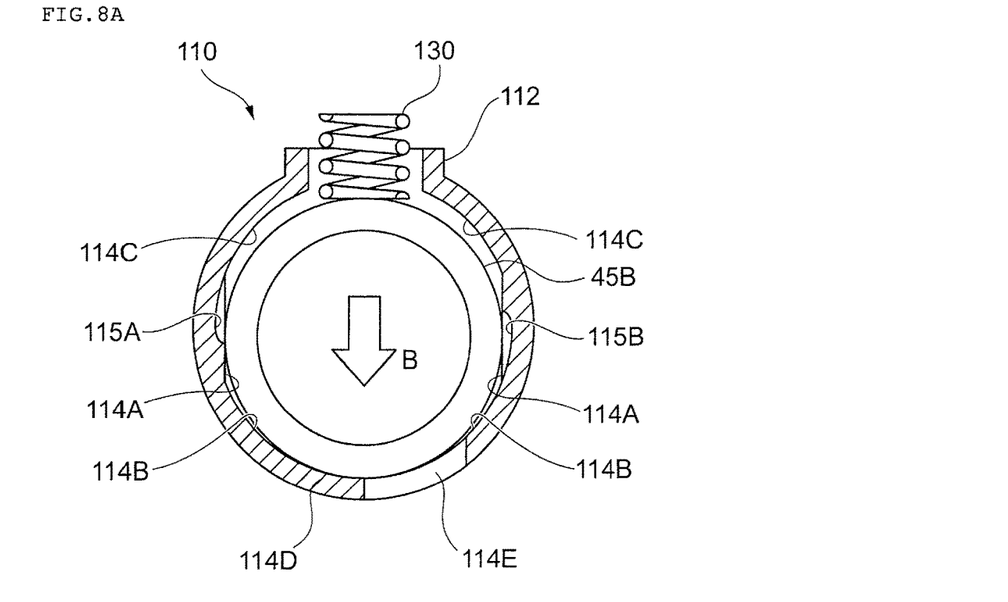
FIGS. 8A and 8B are diagrams illustrating operations of a preload mechanism.
Figure 8B:
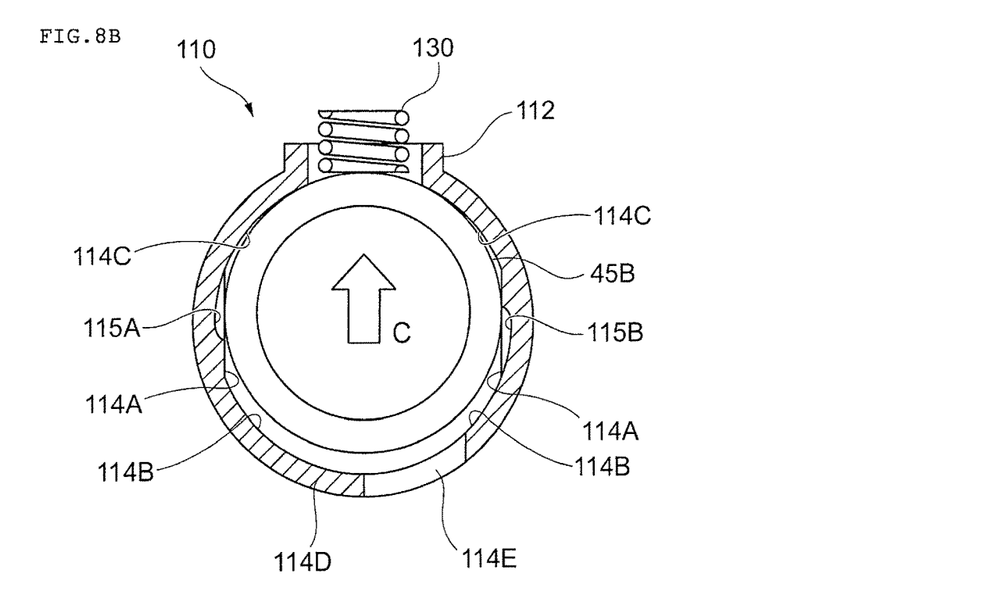

FIGS. 8A and 8B are diagrams illustrating operations of the preload mechanism 100. FIGS. 8A and 8B depict only important functional members of the preload mechanism 100 and not depict some of the functional members.

Effects of the recessed portions 115 will be described with reference to FIG. 6 and FIGS. 8A and 8B.

First, description will be given of operations of the preload mechanism 100 from which the recessed portions 115 are omitted unlike in the present embodiment. As depicted in FIG. 8A, in a normal state, the second bearing 45B is biased toward the worm wheel 43 (in the preload direction; see arrow B in FIG. 8A) by an elastic force of the coil spring 130. At this time, the second bearing 45B is brought into abutting contact with the inner surface 114 opposite to the coil spring 130 (that is, the first abutting contact surfaces 114B).

Then, when the driver of the vehicle in which the electric power steering apparatus 1 is mounted rotationally operates the steering wheel (not depicted in the drawings), a meshing reaction force is generated between the worm gear 42 and the worm wheel 43. As depicted in FIG. 8B, the reaction force allows the second bearing 45B to move away from the worm wheel 43 (in the direction opposite to the preload direction; see arrow C in FIG. 8B) along the guide surfaces 114A and to collide against a side of the inner surface 114 closer to the coil spring 130 (that is, the second abutting contact surfaces 114C). Subsequently, due to the elastic force of the coil spring 130 and the like, the second bearing 45B moves toward the worm wheel 43 (see arrow B in FIG. 8A) and returns to the original position and to the normal state where the second bearing 45B is in abutting contact with the inner surface 114 opposite to the coil spring 130 (that is, the first abutting contact surfaces 114B).

As described above, the meshing reaction force between the worm gear 42 and the worm wheel 43 allows the second bearing 45B to slide in the preload direction and in the direction opposite to the preload direction. As the second bearing 45B slides, the grease applied to the guide surfaces 114A of the inner surface 114 is pushed aside (or splashes). In other words, when the second bearing 45B moves to the first abutting contact surfaces 114B, the grease on the guide surfaces 114A is pushed aside to the first abutting contact surfaces 114B. When the second bearing 45B moves to the second abutting contact surfaces 114C, the grease on the guide surfaces 114A is pushed aside to the second abutting contact surfaces 114C. Consequently, each time the second bearing 45B slides, the grease between the second bearing 45B and each guide surface 114A is swept away, hence sliding resistance after sliding of the second bearing 45B is higher than sliding resistance before sliding of the second bearing 45B. Then, for example, the second bearing 45B may fail to slide smoothly or noise (sliding sound) may be generated.

In the present embodiment, grease is held in the recessed portions 115, which are recessed from the guide surfaces 114A, as described above. Thus, even when the grease on the guide surfaces 114A is pushed way or splashes as the second bearing 45B slides, the grease held in the recessed portions 115 is scooped up by the second bearing 45B. Furthermore, while the second bearing 45B is in abutting contact with the first abutting contact surfaces 114B or the second abutting contact surfaces 114C after moving, the grease may ooze out from the recessed portions 115 due to vibration or the weight of the grease. In this manner, the grease adheres to the guide surfaces 114A and the second bearing 45B and is fed to between the second bearing 45B and the guide surfaces 114A. This suppresses the lack of grease between the second bearing 45B and the guide surfaces 114A.

Additionally, even when the second bearing 45B slides to push aside the grease, grease is fed from the recessed portions 115, and this prevents the sliding resistance after sliding of the second bearing 45B from differing from the sliding resistance before sliding of the second bearing 45B. This configuration also restrains the second bearing 45B from failing to slide smoothly due to the lack of grease and suppresses possible noise (sliding sound). Durability of the second bearing 45B is also enhanced.

Even when the grease held in the recessed portions 115 decreases, sliding and vibration of the second bearing 45B and the weight of the grease may cause the grease pushed aside to the first abutting contact surfaces 114B or the second abutting contact surfaces 114C to return to the recessed portions. Thus, appropriate lubricity is maintained over a long period.

Furthermore, as described above, the recessed portion 115A and the recessed portion 115C (see FIG. 7A) are formed to be discontinuous, at the first ends of the recessed portions, with the first abutting contact surface 114B and to be continuous, at the second ends of the recessed portions, with the second abutting contact surface 114C. Meanwhile, the recessed portion 115B and the recessed portion 115D (see FIG. 7A) are formed to be continuous, at the first ends of the recessed portions, with the first abutting contact surface 114B and to be discontinuous, at the second ends of the recessed portions, with the second abutting contact surface 114C. If the recessed portions 115 are formed in this manner, when the second bearing 45B moves in the preload direction (see arrow B in FIG. 8A), the grease is likely to be scooped up from the recessed portion 115B and the recessed portion 115D, which are continuous with the first abutting contact surface 114B. On the other hand, since the recessed portion 115A and the recessed portion 115C are discontinuous with the first abutting contact surface 114B, at least a portion of the grease remains without being scooped up. When the second bearing 45B moves in the direction (see arrow C in FIG. 8B) opposite to the preload direction, the grease is likely to be scooped up from the recessed portion 115A and the recessed portion 115C, which are continuous with the second abutting contact surface 114C. On the other hand, since the recessed portion 115B and the recessed portion 115D are discontinuous with the second abutting contact surface 114C, at least a portion of the grease remains without being scooped up. As described above, in the present embodiment, the recessed portions from which the grease is fed to between the second bearing 45B and the guide surfaces 114A are formed in association with the moving direction of the second bearing 45B.

[Variation of the Recessed Portions 115]

Figure 9A:
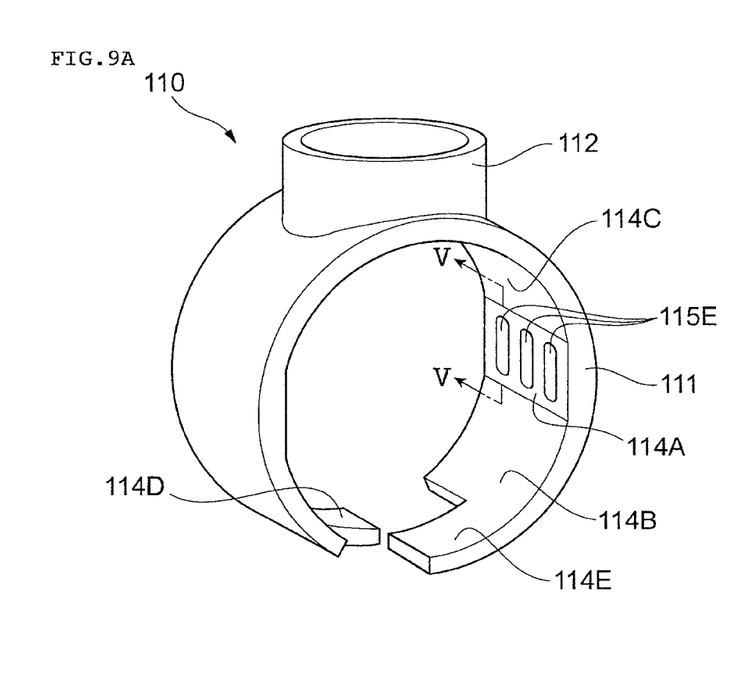
FIGS. 9A and 9B are diagrams depicting a variation of a recessed portion.
Figure 9B:
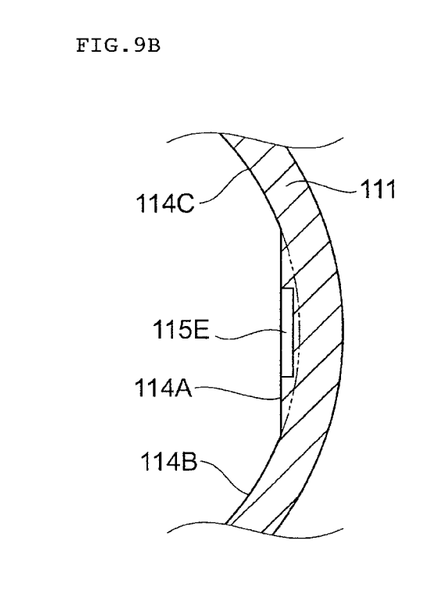
Figure 10A:
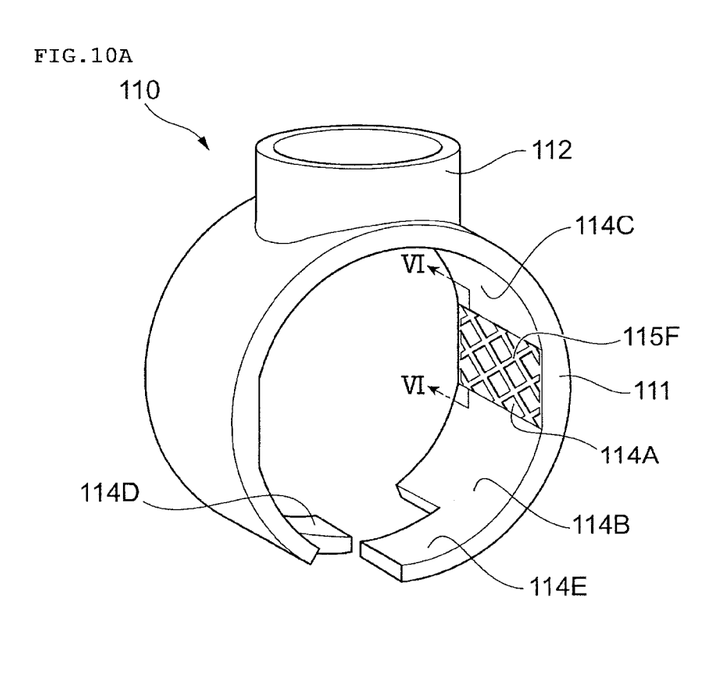
FIGS. 10A and 10B are diagrams depicting a variation of the recessed portion.
Figure 10B:
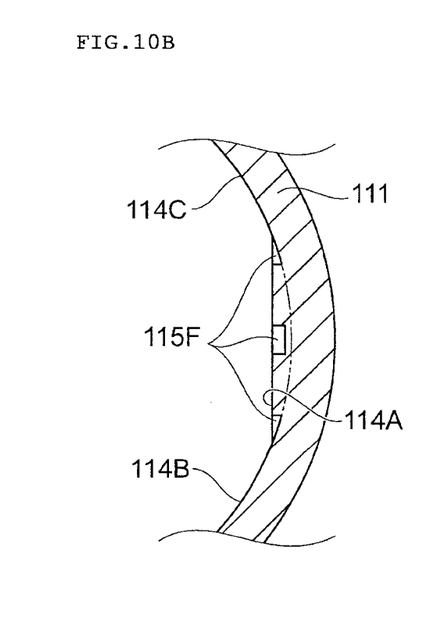
Figure 11A:
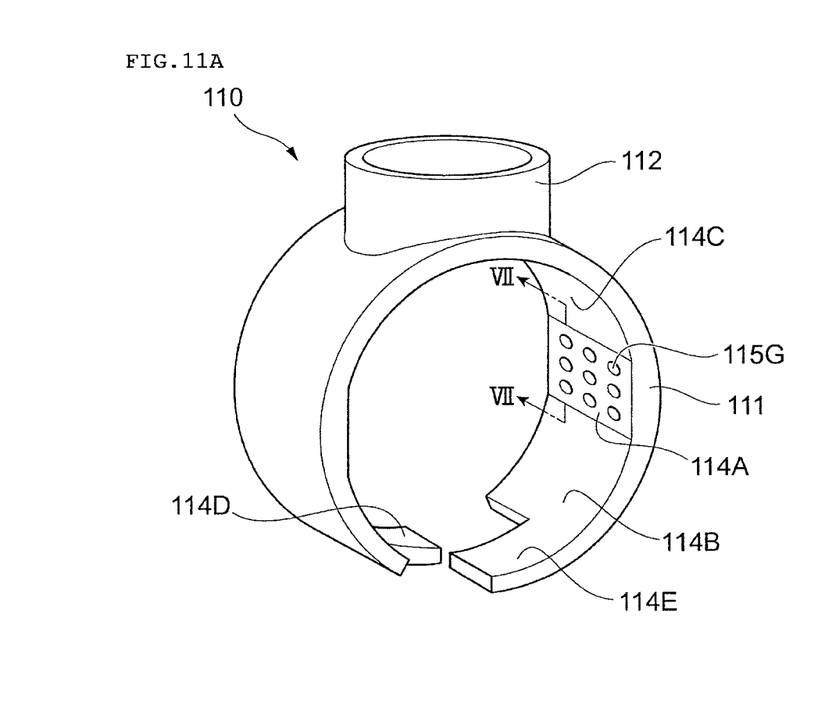
FIGS. 11A and 11B are diagrams depicting a variation of the recessed portion.
Figure 11B:
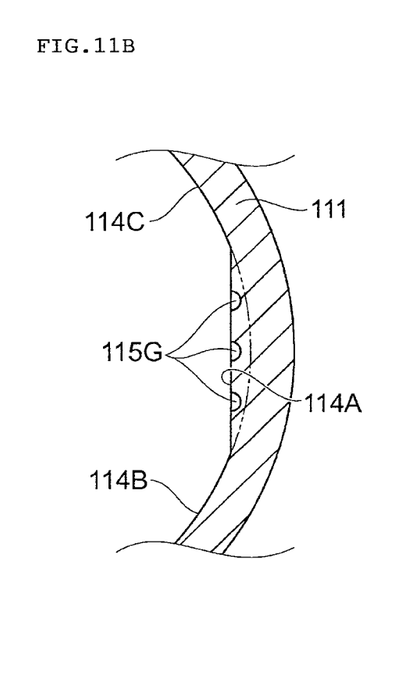

FIGS. 9A to 11B are diagrams depicting variations of the recessed portions 115. Specifically, FIG. 9A is a perspective view of the bearing case 110. FIG. 9B is a sectional view of the bearing case 110 depicted in FIG. 9A, the view being taken along line V-V in FIG. 9A. FIG. 10A is a perspective view of the bearing case 110. FIG. 10B is a sectional view of the bearing case 110 depicted in FIG. 10A, the view being taken along line VI-VI in FIG. 10A. FIG. 11A is a perspective view of the bearing case 110. FIG. 11B is a sectional view of the bearing case 110 depicted in FIG. 11A, the view being taken along line VII-VII in FIG. 11A. Components in FIGS. 9A to 11B that are the same as corresponding components depicted in FIGS. 7A and 7B are denoted by the same reference numerals, and detailed descriptions are omitted.

With reference to FIGS. 9A to 11B, a variation of the recessed portions 115 will be described.

In the above description, as depicted in FIG. 7A, the recessed portions 115 are formed to be continuous, at the first ends, with either the first abutting contact surfaces 114B or the second abutting contact surfaces 114C. However, the present invention is not limited to such a configuration.

For example, as depicted in FIGS. 9A and 9B, recessed portions 115E may be formed to be discontinuous with both the first abutting contact surfaces 114B and the second abutting contact surfaces 114C at respective ends of each recessed portion. When the recessed portions 115E are formed to be discontinuous with both the first abutting contact surfaces 114B and the second abutting contact surfaces 114C at respective ends of each recessed portion, at least a portion of the grease remains in the recessed portions 115E without being scooped up regardless of whether the second bearing 45B moves in the preload direction or the direction opposite to the preload direction. Thus, the grease is easily held in the recessed portions 115E, with appropriate lubricity maintained over a long period.

The recessed portions 115 are not limited to the groove shapes in the guide surfaces 114A extending along the moving direction of the second bearing 45B. For example, as depicted in FIGS. 10A and 10B, the recessed portions 115 may be net-like grooves formed in the guide surfaces 114A. More specifically, recessed portions 115F are defined by a plurality of grooves extending in two directions different from the moving direction of the second bearing 45B and crossing one another. As described above, the grooves of the recessed portions 115F extend in the direction different from the moving direction of the second bearing 45B. Consequently, at least a portion of the grease remains in the recessed portions 115F without being scooped up regardless of whether the second bearing 45B moves in the preload direction or the direction opposite to the preload direction. Thus, the grease is easily held in the recessed portions 115F, with appropriate lubricity maintained over a long period.

Moreover, the recessed portions 115 are not limited to the groove shapes and may have any shapes so long as the recessed portions are recessed from the guide surfaces 114A. For example, as depicted in FIGS. 11A and 11B, a large number of dimples shaped like hemispheres instead of grooves may be formed as recessed portions 115G. In this case, the recessed portions 115G are discontinuous with both the first abutting contact surfaces 114B and the second abutting contact surfaces 114C. Consequently, at least a portion of the grease remains in the recessed portions 115G without being scooped up regardless of whether the second bearing 45B moves in the preload direction or the direction opposite to the preload direction. Thus, the grease is easily held in the recessed portions 115G, with appropriate lubricity maintained over a long period.

In the above description, the main body 111 of the bearing case 110 is generally annular member shaped generally like the letter C by cutting out a part of the main body 111 in the circumferential direction. However, of course, the circumferential cutout need not be formed in the main body 111, and the main body 111 may be formed as a continuous annular member.

Many variations have been described. However, the variations may be combined together.

The present disclosure is not limited to the above-described embodiments. The present disclosure may be implemented in a variety of forms without departing from the spirits of the present disclosure.

The invention claimed is:

1. A power steering apparatus comprising:
   a worm gear that is rotated by receiving a driving force;
   a bearing member that supports the worm gear so as to make the worm gear rotatable;
   a worm wheel that is connected to the worm gear so as to be rotatable and apply a steering assist force to a steering wheel; and
   a support member that supports the bearing member so as to make the bearing member slidable in a crossing direction that crosses a rotating shaft of the worm wheel, the support member having a guide surface along which movement of the bearing member in the crossing direction is guided and a holding portion that holds a lubricant in a recessed portion that is recessed from the guide surface.

2. The power steering apparatus according to claim 1, wherein the recessed portion of the support member is a groove extending along a moving direction of the bearing member.

3. The power steering apparatus according to claim 2, wherein the support member has a first abutting contact surface with which the bearing member comes into abutting contact when the bearing member moves to one side of the moving direction and a second abutting contact surface with which the bearing member comes into abutting contact when the bearing member moves to an opposite side to the one side, and
wherein the recessed portion of the support member is a plurality of grooves extending along the moving direction of the bearing member, a part of the plurality of grooves are discontinuous, at first ends thereof, with the first abutting contact surface and are continuous, at second ends thereof, with the second abutting contact surface, and an other part of the plurality of grooves are continuous, at first ends thereof, with the first abutting contact surface and are discontinuous, at second ends thereof, with the second abutting contact surface.

4. The power steering apparatus according to claim 2, wherein the support member has a first abutting contact surface with which the bearing member comes into abutting contact when the bearing member moves to one side of the moving direction and a second abutting contact surface with which the bearing member comes into abutting contact when the bearing member moves to an opposite side to the one side, and wherein the recessed portion of the support member is discontinuous, at respective ends thereof, with both the first abutting contact surface and the second abutting contact surface.

5. The power steering apparatus according to claim 1, wherein the recessed portion of the support member has meshed grooves.

6. The power steering apparatus according to claim 1, wherein the recessed portion of the support member has a plurality of dimples.

7. The power steering apparatus according to claim 1, further comprising:
a compression member that applies a force to the bearing member so as to press the worm gear against the worm wheel.

\* \* \* \* \*